June 4, 1963   C. R. DAVIDSON, JR   3,092,413
APPARATUS FOR GRIPPING AND SUPPORTING GLASS SHEETS
Filed Jan. 14, 1959
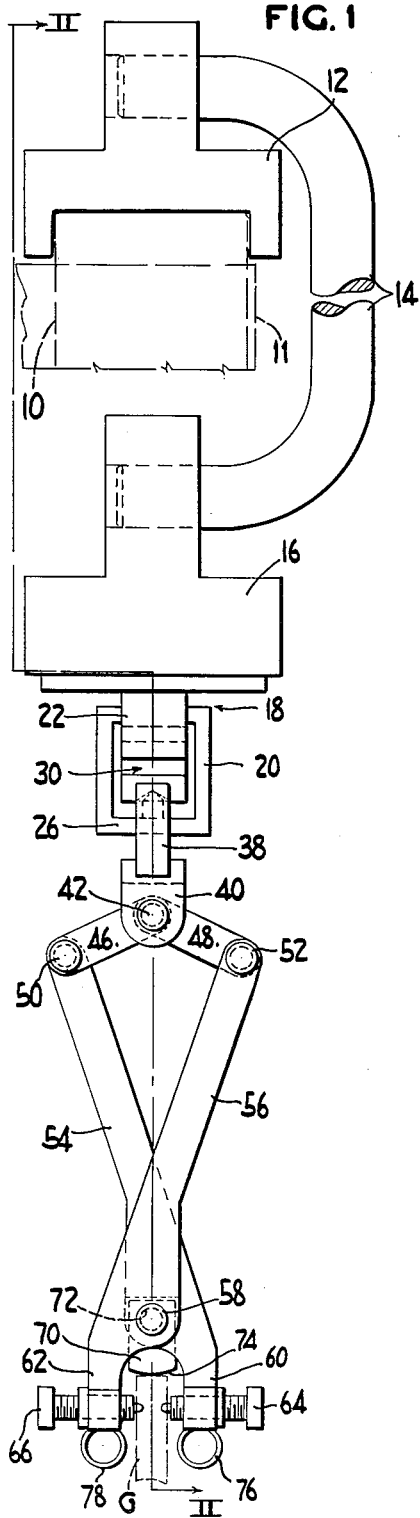
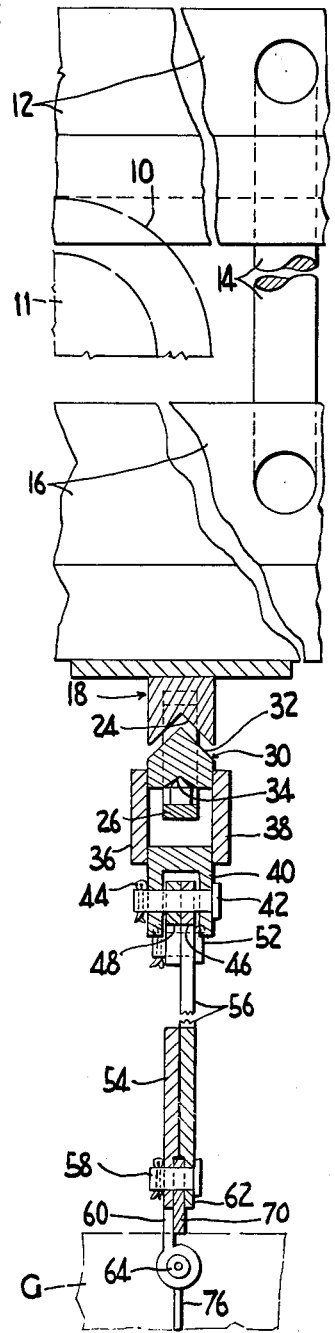
INVENTOR.
CHARLES R. DAVIDSON JR
BY Oscar L Spencer
ATTORNEY

United States Patent Office 3,092,413
Patented June 4, 1963

3,092,413
APPARATUS FOR GRIPPING AND SUPPORTING
GLASS SHEETS
Charles R. Davidson, Jr., Tarentum, Pa., assignor to Pittsburgh Plate Glass Company, Allegheny County, Pa., a corporation of Pennsylvania
Filed Jan. 14, 1959, Ser. No. 786,722
3 Claims. (Cl. 294—86)

This invention relates to supporting glass sheets, and specifically refers to tongs for gripping glass sheets during thermal treatment.

Tongs have been used for supporting glass sheets vertically for thermal treatment by gripping the opposite glass surfaces. The tongs are supported by a clevis attached to a carriage which rides in an overhead monorail extending through thermal treatment apparatus.

Since glass sheets are heated to substantially the softening point during thermal treatment required for tempering or for certain coating procedures, the tong points penetrate the glass surfaces and mar the latter. When coated or tempered glass sheets are used as viewing closures, is is necessary that tong marks caused by tong penetration be kept close to the margin of the glass sheets so that they are ultimately covered by a frame member and do not mar the vision area of the treated glass sheet.

To avoid the presence of tong marks in the viewing area, glass sheet gripping tongs have been provided with a stop member to limit the uppermost position of the upper edge of the glass sheet supported between the tongs for tempering.

In order for glass sheet tongs to work properly, it is necessary that the tongs hang freely so that the tong points can grip the glass by engaging its opposite surfaces. However, when the tongs are being loaded with glass sheets prior to a thermal treatment operation, it is also necessary that the tongs resist upward movement so that the tongs are not displaced upwardly out of alignment with the glass sheet when the top edge of the glass sheet contacts the tongs' stop member.

According to the present invention, glass sheet gripping tongs are attached to a movable member having a shaped upper surface and an angular lower surface and constructed and arranged for vertical movement within a frame member forming part of a tong support member. The frame member comprises an upper portion including a downwardly facing member whose bottom surface conforms in shape to that of the shaped upper surface of the movable member and a lower portion spaced below the upper portion and including an upwardly facing angular member. The movable member is constructed and arranged for vertical movement within the frame member between an upper position wherein its upper surface engages the downwardly facing angular member in rigid nesting or locked relation therewith and a lower position wherein its angular lower surface is supported in freely pivotable relation about a vertical axis defined by said upwardly facing angular member.

The invention will be further understood in the light of an explanation of an illustrative embodiment of the present invention which follows. It is understood that the explanation is for the purpose of illustration rather than limitation. Reference to the latter may be obtained by studying the claims accompanying this disclosure.

In the drawings which form part of the description,
FIGURE 1 is an elevational view of a portion of a pair of glass supporting tongs taken across the thickness of a sheet of glass shown in phantom being gripped by said tongs.

FIGURE 2 is a sectional view taken along the lines II—II of FIGURE 1 showing the tongs hanging in freely supporting relation.

FIGURE 3 is a fragmentary sectional view similar to that of FIGURE 2 showing the details of the locking and supporting element in its uppermost position wherein the tongs are rigidly supported to receive a glass sheet.

Referring to the drawings, reference number 10 refers to a drive roll of an overhead conveyor which is mounted on a drive shaft 11. A carriage having an upper portion 12, a C-shaped connector 14 and a lower portion 16 is moved through glass treating apparatus by rotation of the drive roll 10 of the overhead conveyor. These portions are shown in phantom and parts are broken away in order to provide large scale drawings of the tongs modified according to an embodiment of the present invention in sufficient detail so that the present invention can be understood.

Attached to the bottom of the lower portion 16 of the carriage is a tong support member 18 which comprises a frame member 20. The latter comprises an upper portion 22 having a downwardly facing angular bottom surface 24 and a bottom 26 having an upwardly facing angular member 28 attached thereto. In the specific embodiment of the invention disclosed, the downwardly facing bottom surface 24 is recessed to provide a groove and the upwardly facing angular member 28 is in the form of a pointed member whose apex extends upwardly. The reasons for this specific construction will be understood in connection with the description of the tong support member which follows.

Within the frame 20 is a movable member 30 having an angular upper surface 32 of exactly the same shape as that of the downwardly facing bottom surface 24 of the upper portion 22 of frame member 20 and having an angular lower surface 34 shown in the illustrative embodiment as grooved at a larger angle than that of the point of the upwardly facing angular member 28 attached to the bottom portion 26 of the frame member 20. The thickness of movable member 30 is less than the distance separating the upper portion 22 and the bottom portion 26 of the frame member 20 to permit its vertical movement between these frame portions. Connector plates 36 and 38, the bottom portions of which are fixed to a clevis 40, are attached to the walls of the movable member 30.

The clevis 40 provides a support for a tong support pin 42 extending therethrough and secured in place by means of a cotter pin 44. Upper links 46 and 48 are pivoted to tong support pin 42 at their upper ends and at their bottom ends carry one of a pair of link pins 50 and 52 which pivotally secure the upper links 46 and 48 to tong arms 54 and 56. A common hinge pin 58 pivotally secures tong arms 54 and 56 to each other. The tong support pin 42, the link pins 50 and 52 and the common hinge pin 58 provide substantially parallel horizontal axes about which the upper links 46 and 48 and the tong arms 54 and 56 pivot relative to each other.

Tong arm 54 terminates in an apertured bottom portion 60, while tong arm 56 terminates in an apertured bottom portion 62. The respective bottom portions are both apertured along axes normal to the link pins 50 and 52 and common hinge pin 58 to receive pointed screws 64 and 66, respectively. The opposed points of the pointed screws 64 and 66 form the tong points between which a glass sheet is gripped. The tong arms and links are so constructed that the tong points 64 and 66 are urged to move toward each other to grip a sheet of glass G, shown in phantom, therebetween.

A stop member 70 is apertured at 72 to receive the common hinge pin 58. Stop member 70 is sandwiched between the bottom portion 60 of tong arm 54 and bottom portion 62 of tong arm 56 in such a manner that the apertures are aligned to receive the common hinge pin 58. The bottom edge 74 of stop member 70 is preferably of convex construction so as to make tangential contact with the upper edge of glass sheet G. Also, the stop member 70 is so constructed that its center of gravity is located within the portion provided with the arcuate surface 74, thus insuring that the arcuate surface 74 is in position to contact the upper edge of a glass sheet G.

In order to align the glass sheet more properly for loading, and to insure that the glass sheet enters the tongs properly, guide members 76 and 78 are attached to the bottom of bottom portions 60 and 62, respectively. The guides may be in the form of metal rings whose periphery extends within the inboard surface of the opposing bottom portions, but whose minimum separation is slightly greater than that between the tong points. Therefore, the upper edge of the glass sheet G moves upwardly within the space defined by guide members 76 and 78 when it is inserted between the tongs for loading.

The operation of the illustrative embodiment of the present invention depends upon the fact that the movable member 30 is fixed in position relative to the tong support pin 42. This relation results from the interconnection between movable member 30 and clevis 40 through which the tong support pin 42 extends by means of the connector plates 36 and 38.

The operation of the apparatus is as follows. When a glass sheet G is loaded onto the tongs, it is pushed upwardly until its upper edge contacts the bottom edge 74 of the stop member 70. Further upward thrusting causes the tongs to spread outwardly until the tong points 64 and 66 contact the opposite surfaces of the glass sheet. At the same time, the tongs are also pushed upwardly until the angular upper surface 32 of the wedge-shaped member which moves upwardly with the tongs engages into locked relation with the downwardly facing bottom surface 24 of the upper portion 22 of the frame member 20. The weight of the carriage riding on the drive roll 10 of the overhead conveyor is greater than the upward thrust normally applied to insert the glass sheet G for gripping engagement with the tongs. Therefore, the tong support mechanism provides a rigid support for engaging the glass sheet G with tongs, while the attachment of the relatively light movable member 30 to the tong support pin 42 for movement with the tongs when the tongs are loaded with a glass sheet provides a flexibility in the tong structure to adjust its position in response to any urging by the glass sheet during the interval when the movable member is out of contact with pointed member 28 and the downwardly facing surface 24 of the upper portion 22 of frame member 20 and the attached tongs are moving in response to the thrust imparted thereto by the glass sheet.

As soon as the upper edge of the glass sheet contacts the convex bottom edge 74 of the stop member 70, the glass sheet can be released from all support except that from the tongs. As the support for the glass sheet is released, the tongs move downwardly until the angular bottom surface 34 of the wedge-shaped member 30 contacts the upwardly facing angular member 28 of the bottom portion 26 of the frame member 20. Since the upwardly facing angular member 28 is a pointed member having a smaller apical angle than that of the recessed angular lower surface 34 of the wedge-shaped member 30, the tongs are free to pivot and do not cause strains in the glass sheet by virtue of any exterior stress applied to the sheet.

The engagement of the wedge-shaped member in locked or nesting relation with the downwardly facing nonlinear bottom surface 24 of the upper portion 22 of the frame member 20 is shown in FIGURE 3, whereas the freely pivoting position for the tongs is shown in FIGURE 2.

It is understood that while a particular embodiment of the present invention has been illustrated, that various changes may be made in the light of the present invention. For example, the tong support member 18 may be constructed of other than a frame member. Furthermore, the upper portion may have a downwardly facing nonlinear surface that is pointed rather than grooved and the upper wedge surface may be grooved rather than pointed or the matching uppermost surface of the wedge-shaped member 30 may be of any configuration that conforms to the downwardly facing bottom surface 24 of the upper portion 22 of the frame member 20. Also, in lieu of having the upper surface 32 of movable member 30 complementary in shape to the bottom surfaces of the upper frame member 20, the movable member 30 may be locked in its uppermost position by means of spline engagement, keyhole locks and other locking devices that enable the tongs to be locked in rigid relation to the tong support member in their uppermost position.

What is claimed is:

1. Apparatus for gripping a glass sheet suspended therefrom comprising a relatively heavy tong support member having attached thereto a frame member comprising an upper portion including a downwardly facing member having a bottom surface of a nonlinear configuration and a lower portion spaced below and attached to said upper portion and including an upwardly facing pointed member attached to said lower portion, a relatively light movable member having an upper surface shaped to conform to the bottom surface of said downwardly facing member and an angular lower surface, means attached to said movable member for guiding said movable member for vertical movement within said frame member between an upper position wherein its upper surface engages said bottom surface of said downwardly facing member in locking relation therewith and a lower position wherein its angular lower surface is supported in freely pivotable relation about a vertical axis defined by said upwardly facing pointed member, and tongs secured to said means attached to said movable member to hang downwardly therefrom, one of said surfaces engaging in locking relation having a projection mating with a recess in the other of said surfaces engaging in locking relation when said surfaces are engaged in locking relation with one another.

2. Apparatus for gripping a glass sheet suspended therefrom comprising a relatively heavy tong support member having attached thereto a frame member comprising an upper portion including a downwardly facing grooved member and a lower portion spaced below and attached to said supper portion and including an upwardly facing pointed member attached to said lower portion, a relatively light movable member having a pointed upper surface having a contour matching the grooved bottom surface of said downwardly facing grooved member and a grooved lower surface having an angle greater than the apex angle of the upwardly facing pointed member and means attached to said movable member for guiding said movable member for vertical movement within said frame member between an upper position wherein its pointed upper surface engages said downwardly facing grooved member in mating relation therewith and a lower position wherein its grooved lower surface is supported in freely pivotable relation about a vertical axis provided by said upwardly facing pointed member, and tongs secured to said means attached to said movable member to hang downwardly therefrom.

3. In apparatus for gripping a flat glass sheet comprising a relatively heavy tong support member and a pair of tongs including a tong support pin, upper links pivoted at their upper end to the tong support pin, a tong arm pivoted to the lower end of each of said upper links, a common hinge pin pivotally securing the tong arms to each other, and opposing gripping members carried by said tong arms below said common hinge pin, the improvement comprising a relatively light vertically movable member attached to said tong support pin and free to move vertically relative to said tong support member between an upper vertical position and a lower vertical position, cooperating means including a nonlinear bottom surface of said tong support member and an upper surface of said movable member conforming in shape to that of said nonlinear bottom surface and adapted to engage in nesting relation with said nonlinear bottom surface for locking said movable member in position relative to said tong support member at the upper vertical position of said movable member and additional cooperating means carried by said tong support member and said movable member for permitting free pivotable movement between said movable member and said tong support member at the lower vertical position of said movable member.

References Cited in the file of this patent
UNITED STATES PATENTS

| | | |
|---|---|---|
| 2,100,497 | White | Nov. 30, 1937 |
| 2,115,106 | Hinsey | Apr. 26, 1938 |
| 2,476,169 | White et al. | July 12, 1949 |
| 2,710,493 | Glynn | June 14, 1955 |
| 2,745,695 | Peyer | May 15, 1956 |